United States Patent

[11] 3,590,236

| [72] | Inventor | Abner E. Ussery<br>2500 S.W. 58th St., Oklahoma City, Okla. 73119 |
|---|---|---|
| [21] | Appl. No. | 744,794 |
| [22] | Filed | July 15, 1968 |
| [45] | Patented | June 29, 1971 |

[54] TOWING LIGHT ASSEMBLY FOR USE ON A TOWED VEHICLE
1 Claim, 4 Drawing Figs.

[52] U.S. Cl............................................... 240/7.1,
240/2, 248/226, 280/502
[51] Int. Cl..................................................... B60q 7/00,
B60d 1/00
[50] Field of Search............................................240/7.1, 7.1
F, 7.1 G, 2, 8.18, 8.3; 224/42.03; 280/186, 502;
248/214, 215, 226, 227

[56] References Cited
UNITED STATES PATENTS

| 3,013,754 | 12/1961 | Hastings...................... | 248/226 X |
| 3,083,292 | 3/1963 | Roe et al....................... | 240/8.3 |
| 3,423,106 | 1/1969 | Parkhurst..................... | 280/502 |
| 3,446,519 | 5/1969 | Garner......................... | 280/502 |

*Primary Examiner*—Samuel S. Matthews
*Assistant Examiner*—Joseph F. Peters, Jr.
*Attorney*—Dunlap, Laney & Hessin

ABSTRACT: A towing light assembly for use on a towed vehicle including an elongated bar having mounted on the opposite end portions thereof a pair of lights, and having slidably mounted thereon a pair of bumper fastener assemblies for detachably securing the bar to the bumper of a towed vehicle. The bumper fastener assemblies include a sleeve slidably surrounding the elongated bar and having an anchor plate projecting from opposite sides of the sleeve and a spacer subassembly projecting between the sleeve and a bumper to which the towing light assembly is attached. The upper portion of the anchor plate is slotted so as to be detachably engageable with the links of a first anchor chain which can be hooked over one edge of the towed vehicle bumper by means of a suitable hook element. The lower portion of the anchor plate carries a locknut and eyebolt to which is attached one end of a chain which is detachably connected to a bent-bar bumper-engaging member.

PATENTED JUN29 1971
3,590,236
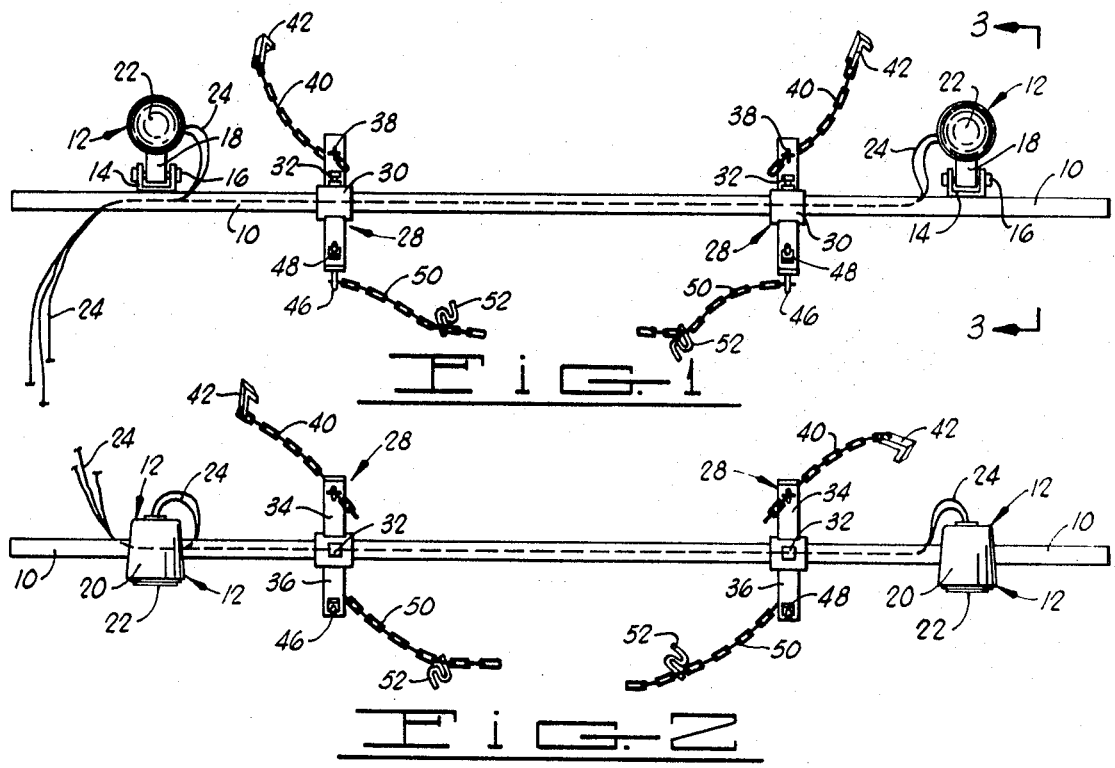
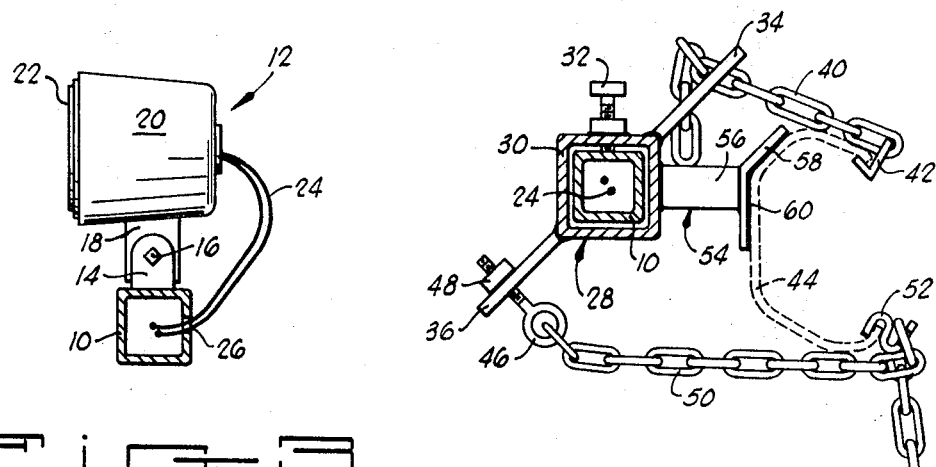
INVENTOR.
ABNER E. USSERY
BY
Dunlap, Laney & Hessin
ATTORNEYS

TOWING LIGHT ASSEMBLY FOR USE ON A TOWED VEHICLE

BACKGROUND OF THE INVENTION

1. Field of the Invention

This invention relates to safety devices useful in towing vehicles over roads and highways. More particularly, the present invention relates to a towing light assembly which can be quickly attached to or detached from the bumper of a vehicle under tow, with the towing device being adapted for securement to bumpers of various sizes and configurations on various types of towed vehicles.

2. Brief Description of the Prior Art

Motor vehicles not infrequently become disabled to the extent that they cannot move under their own power. On these occasions, it is necessary to dispatch a wrecker or other towing vehicle to the situs of the disabled vehicle for the purpose of towing the disabled vehicle to a location where repairs necessary to reinstill locomotive ability in the vehicle can be effected. In other instances, tows of various sizes must be moved from one location to another by a towing vehicle over roads and highways which are utilized to varying extents by additional traffic. On all occasions of towing over-the-road vehicles at night, it is desirable that the towed vehicle or structure be illuminated in some way so as to apprise following or approaching vehicles of the presence of such structures. Various types of lights and reflector devices have been used for this purpose, and have achieved the objective of apprising motorists of the presence and movements of the towed vehicle with varying degrees of success.

It is, of course, desirable that an electrically illuminated light be employed, rather than a reflector, and it is further desirable that such lights as may be installed upon the towed vehicle be capable of indicating to following motorists, the movements contemplated by the towing vehicle and transmitted to the vehicle under tow. Thus, the lights which are mounted on the towing vehicle are preferably capable of indicating when a stop is about to be made, or is in the process of being made, and when a turn is to be made.

In the broad sense, two general solutions to the problem of providing the necessary illumination of towed vehicles have been adopted in the past. One of these solutions contemplates the use of already-existing signal lights present on the towed vehicle, such as the stop and tail lights of an automobile under tow. A problem is frequently engendered by the usage of the lights of the towed vehicle in this fashion. This problem is that of discharging the battery of the towed vehicle by the time the destination to which it is to be pulled has been reached. This then leaves the towed vehicle without any available self-contained power source, and frequently causes damage to the battery. Another defect of this method of illuminating the towing vehicle is the usual inability to signal turns with the lights of the towed vehicle unless an operator is present in the towed vehicle, thus requiring at least a two-man crew to complete the tow.

Another type of solution which is the only option available in some instances, and which is employed because of the battery discharge problem in other cases, is that of mounting temporary lamps on the towed vehicle in a conspicuous location in order to provide the necessary safety during the course of the tow. If these temporarily affixed lamps are to be electrically operated, the alternatives then exist of either running the electrical leads from the lamps to the battery of the towed vehicle with the result that the battery is discharged in the same manner as if the lamps of the towed vehicle were themselves used, or running the electrical leads to the towing vehicle. This latter arrangement has the merit of avoiding discharge of the battery of the towed vehicle, but often is not convenient to accomplish due to the excessive length of the leads associated with the temporary or portable lamp installed on the towed vehicle, and the necessity to extend these leads from an inconvenient point on the towed vehicle past the towed vehicle to the towing vehicle. Moreover, where temporary portable signal lamps are employed on the towed vehicle, it is frequently difficult to secure them in an optimum location on the towed vehicle due to the particular configuration or manner of mounting or securement of the clamps or brackets forming a part of such temporary lamps, or due to the fact that they have been designed for use on a particular type of bumper or structure characteristic of only a few types of towed vehicles. The problem of accommodating such temporary, portable lamps to the towed vehicle is often substantially greater where the towing vehicle is in frequent use for pulling a number of different types of immobilized vehicles, as wreckers and tow trucks normally are expected to do.

BRIEF DESCRIPTION OF THE PRESENT INVENTION

The present invention provides an improved towing light assembly which may be fairly described as universal, since it can be affixed securely and in a clearly visible position to virtually any type of towed vehicle having a bumper. The towing light assembly of the invention has the merit of being very easily and quickly secured to the vehicle to be towed, and the lights of the towing light assembly are disposed in the assembly where they can be clearly seen at all times by motorists approaching the towed vehicle.

Broadly described, the towing light assembly of the present invention comprises an elongated rod or bar which has mounted in spaced relation therealong a pair of electric lamps or lights. Slidably mounted on the elongated bar in the interval between the electric lights are a pair of bumper fastener assemblies which are utilized to secure the bar, and the lights which it carries, at two points along the bumper of a towed vehicle. The fastener assemblies each include a sleeve which slidably engages the elongated bar, and which has secured thereto an anchor plate which projects from the opposite sides of the sleeve in directions forwardly and upwardly from the elongated bar, as well as downwardly and rearwardly therefrom.

The upper portion of the anchor plate is slotted so that the links of a chain can be passed sideways through the slot, but may be engaged therewith when rotated through an angle of 90°. A chain thus adjustably secured to the upper portion of the anchor plate carries at an end spaced from the anchor plate a fastener hook 42 which can be hooked over one edge of a motor vehicle bumper. At its lower and outer end portion, the anchor plate has an eyebolt adjustably secured therethrough by means of a locknut. The eye of the eyebolt engages the end link of a second chain which is extended beneath the lower side of the bumper, and detachably engaged with the bumper by means of an S-shaped bent-bar catch. A spacer subassembly extends from one side of each of the sleeves in each of the fastener assemblies at a location between the points on the sleeve from which the oppositely extending portions of the anchor plate extend. The spacer subassembly includes a spacer pipe or rod and a bumper shoe which is lined with protective web padding.

In a preferred embodiment of the invention, the elongated bar is hollow so that the electrical leads from the electric lights mounted thereon may be extended through the hollow interior of the bar to a location relatively near to one end thereof. From this latter location, the electrical leads may be passed through an aperture in the bar and extended to the towing vehicle in order to connect the lights to a source of current. A preferred embodiment of the invention is also further characterized in having the electric lights pivotally mounted on the elongated bar so that the direction of projection of their beams can be varied as desired.

An object of the present invention as thus broadly described is to provide a towing light assembly which can be quickly and easily secured in a clearly visible position on many types of vehicles or structures which it is desired to tow.

Another object of the invention is to provide a portable, relatively economically manufactured towing light assembly for use on towed vehicles.

An additional object of the invention is to provide a towing light assembly which is adjustable in its points of securement to a towed vehicle so that it can be secured to vehicles having a variety of bumper shapes and lengths.

A further object of the invention is to provide a towing light assembly which may be quickly and easily attached to a towed vehicle and connected to a power source located in the towing vehicle.

In addition to the described objects and advantages, additional objects and advantages will become apparent from the following detailed description of the invention when the invention is considered in conjunction with the accompanying drawings which illustrate the invention.

BRIEF DESCRIPTION OF THE DRAWINGS

FIG. 1 is a rear elevation view of the towing light assembly of the invention.

FIG. 2 is a plan view of the towing light assembly of the invention.

FIG. 3 is a section taken along line 3–3 of FIG. 1.

FIG. 4 is a sectional view taken transversely through the elongate and fastener assembly forming a part of the invention, and illustrating the manner in which the towing light assembly is secured to a bumper.

DETAILED DESCRIPTION OF A PREFERRED EMBODIMENT OF THE INVENTION

The towing light assembly of the invention as illustrated in the drawings includes an elongated bar 10, which in the depicted embodiment is of hollow, rectangular cross section as best illustrated in FIG. 4. Secured to the bar in spaced relation therealong is a pair of electric light assemblies each designated generally by reference numeral 12. Each of the electric light assemblies includes a U-shaped mounting bracket 14 which journals a pivot pin 16 extended through a post 18. At the upper end of the post, a casing or housing 20 (see FIG. 3) is mounted and includes the usual lens 22 and bulb (not visible). Electrical leads 24 extend from the rear of each of the housings 20 and through suitable apertures 26 in the elongated bar 10. The electrical leads 24 from each of the electric light assemblies 12 is passed through the hollow interior of the elongated bar 10 to a slot or aperture (not visible) located adjacent one end of the bar 10. From this slot or aperture, the electrical leads are extended in a direction to permit their securement to the battery or other source of power located on a towing vehicle. It will be appreciated, of course, that the electrical leads 24 can be coiled around the elongated bar 10, or in any other suitable manner stored compactly in an out-of-the-way position, at such time as the towing light assembly is not actually mounted on the towed vehicle, but is rather being itself stored or carried in a tow truck, wrecker or the like.

Positioned between the electric light assemblies 12 and slidably secured to the elongated bar 10 are a pair of horizontally spaced fastener assemblies designated generally by reference numeral 28. Each of the fastener assemblies 28 includes a sleeve 30 which, in the illustrated embodiment of the invention, is a hollow member of rectangular cross-sectional configuration which surrounds the elongated bar 10. Each of the sleeves 30 may be secured in a desired position on the sleeve 10 by means of a set screw 32.

Projecting from the opposite sides of the sleeve 30 and from the diagonally opposed corners thereof in the form of the invention illustrated, is an anchor plate which may be described as having an upper portion 34 and a lower portion 36. The upper portion 34 of the anchor plate extends forwardly and upwardly from the sleeve 30 and the elongated bar 10, and is provided with a slot 38 through which the links of a chain 40 may be extended when the links are oriented with their narrow dimension extended transversely of the slot. After the chain 40 has been drawn through the respective slot 38 in one of the anchor plates, it may be turned through 90° to prevent its being pulled back through the slot in the opposite direction when tension is applied thereto. At a free end which is distally located with respect to the upper portion 34 of the anchor plate, the chain 40 carries a fastener hook 42 which may be a bar bent through an angle in the manner best illustrated in FIG. 4. The fastener hook 42 is secured to the end link of the chain 40, and is configured so that it may be hooked over the upper edge of the bumper of a towed vehicle. In FIG. 4 of the drawings, the fastener hook 42 is shown engaged with the upper edge of a bumper which is illustrated in dashed lines and designated by reference numeral 44.

The lower portion 36 of the anchor plate has extended therethrough an eyebolt 46 which threadedly engages a locknut 48 so that the nut is located on the opposite side of the anchor plate from the eye of the eyebolt. A chain 50 has one of its end links engaged with the eye of the eyebolt 46 and is extended from this point to the bumper 44. At this point, an S-shaped bent-bar catch 52 has one of its legs passed through a link of the chain 50 and its other leg hooked over the lower edge of the bumper 44. The chain 50 can, of course, be tensioned by tightening the locknut 48 upon the threaded shank of the eyebolt 46.

Secured to the flat side of the sleeve 30 which faces toward the bumper 44 is spacer subassembly designated generally by reference numeral 54. The spacer subassembly includes a spacer pipe or bar 56 and a bumper shoe 58. The bumper shoe 58 is preferably angled to accord generally with the contour of the majority of bumpers, but no precise fit or mating of the bumper shoe 58 with all bumpers can be expected nor is it necessary. The bumper shoe 58 is lined with a padding material 60 which prevents scarring or marring of the bumper 44.

As has been indicated, each of the fastener assemblies 28 is identically constructed, and each of these assemblies can be moved to a desired location on the elongated bar 10 by sliding it to the desired position, and then securing the fastener assembly in that position by means of the setscrew 32.

OPERATION

In the operation of the towing light assembly of the invention, the assembly, which is of relatively lightweight and easily transported and stored, is removed from the towing vehicle and is "fitted" to the bumper on the vehicle to be towed. In some instances, this will be the rear bumper and, in others, the front bumper of the disabled vehicle. The particular geometric configuration of the bumper to which the towing light assembly is to be secured is not of great concern due to the adaptability of the invention to substantially any type of bumper. The varying lengths of bumpers on many types of vehicles to be towed can be accommodated by the sliding characteristics of the fastener assemblies 28. Thus, these assemblies are adjusted along the elongated bar 10 until they are aligned with fairly well braced, rigid portions of the bumper to which they are to be secured. The spacer assemblies 54 are then moved into position so that the padding 60 on their respective bumper shoes 58 contacts the bumper. The chain 40 is then positioned in the manner depicted in FIG. 4, with the fastener hook 42 hooked under and engaging the upper edge of the bumper 44. Slack is then removed from this chain by pulling the lower portion 36 of the anchor plate downwardly by the use of the chain 50 until the towing light assembly occupies approximately the position shown in FIG. 4. The bent-bar catch 52 is then hooked over the lower edge of the bumper and through one of the links in the chain 50 selected so that substantially all of the slack is removed from this chain. The chain 50 is then drawn very taut by tightening the locknut 48 on the threaded shank of the eye bolt 46. This has the effect of tensioning both the chain 50 and the chain 40, and of securing the towing light assembly very firmly and rigidly in place.

When the towing light assembly has been secured to the bumper in the manner described, the electrical leads 24 from the electric light assemblies 12 are extended forward to the towing vehicle and secured by suitable alligator clamps or the like to the battery, or to some other source of electrical current which is being continuously supplied electrical power by the generator of the towing vehicle during the course of the tow. The electric light assemblies 12 may then be adjusted in the direction toward which their beams are extended by swiveling the housings 20, and the posts 18 upon which they are mounted, about the pivot pin 16 carried by the mounting brackets 14.

It will have become apparent from the foregoing description, that the towing light assembly of the present invention is mechanically simple and of economic construction, yet provides great flexibility and adaptability in usage, since it can be employed on various types of vehicles having different bumper shapes and sizes thereon. Moreover, the assembly does not occupy a great deal of space, and can be stored relatively easily and conveniently when not in actual use. The electric lights forming a part of the assembly can be operated by power from the towing vehicle, and no necessity exists for utilizing power derived from the storage battery of the towed vehicle.

Although a preferred embodiment of the invention has been described in order to permit those skilled in the art to practice the principles of the invention, it will be appreciated that numerous changes of structure can be effected without departure from these principles. All changes of this type are therefore deemed to be circumscribed by the spirit and scope of the invention except as the same may be necessarily limited by the appended claims or reasonable equivalents thereof.

What I claim is:

1. A towing light assembly comprising:
   an elongated hollow bar of polygonal cross-sectional configuration;
   at least one electric lamp swivel mounted on said bar for pivoting about a horizontal axis for adjusting the beam projected by said lamp; and
   a pair of fastener assemblies each movably mounted on said bar for independent longitudinal sliding movement therealong, and spaced longitudinally along said bar from each other, said fastener assemblies each comprising:
   a sleeve of polygonal cross section slidably surrounding said bar for longitudinal movement therealong;
   a spacer subassembly secured to, and extending horizontally from, said sleeve for spacing the bar and sleeve horizontally from a motor vehicle bumper;
   anchor plate means connected to said sleeve and projecting from said bar on opposite sides thereof, said anchor plate means including:
      a first portion projecting from one side of said bar at substantially a right angle to the longitudinal axis thereof and in the direction said spacer subassembly extends from said sleeve; and
      a second portion projecting from the opposite side of said bar from said first portion at substantially a right angle to the longitudinal axis of said bar and in alignment with the first portion of said anchor plate means;
   a first chain detachably secured to said first portion and having an end remote from the point of securement to said first portion;
   a fastener hook on said remote end of said first chain for fastening said first chain to one edge of said motor vehicle bumper;
   a second chain;
   tensioning means detachably and adjustably securing said second chain to said second portion of said anchor plate means;
   means detachably engaging a link of said second chain and adapted for detachably securing said second chain to said motor vehicle bumper; and
   means extended through the upper side of said sleeve into contact with said elongated bar for releasably securing said fastener assembly at a selected location on said bar.